United States Patent [19]
Brasher

[11] Patent Number: 6,126,220
[45] Date of Patent: Oct. 3, 2000

[54] AUTOMATED CARGO BOX EXTENSION ASSEMBLY

[76] Inventor: Andrew J. Brasher, 110 N. Cherry, Pauls Valley, Okla. 73075

[21] Appl. No.: 09/204,202

[22] Filed: Dec. 2, 1998

[51] Int. Cl.[7] ................................................. B62C 1/06
[52] U.S. Cl. .................................. 296/26.04; 296/26.05; 296/26.07
[58] Field of Search ............................. 296/26.04, 26.05, 296/26.06, 26.07, 99.1

[56] References Cited

U.S. PATENT DOCUMENTS

| | | | |
|---|---|---|---|
| 909,860 | 1/1909 | Apgar . | |
| 3,380,507 | 4/1968 | Bontrager | 160/327 |
| 3,694,024 | 9/1972 | Linville | 296/26 |
| 3,924,889 | 12/1975 | Gogush | 296/137 |
| 4,095,838 | 6/1978 | Beeler | 296/26 |
| 4,206,946 | 6/1980 | Maertens | 297/379 |
| 4,392,682 | 7/1983 | Norkus, Jr. | 296/26 |
| 4,448,453 | 5/1984 | Irelan et al. | 296/27 |
| 4,544,196 | 10/1985 | Schmeichel et al. | 296/26 |
| 4,703,971 | 11/1987 | Schmeichel et al. | 296/26 |
| 4,887,860 | 12/1989 | Dowty | 296/26 |
| 4,981,319 | 1/1991 | Gerzeny et al. | 296/26 |
| 5,088,785 | 2/1992 | Lee | 296/26 |
| 5,366,266 | 11/1994 | Harbison | 296/100 |

*Primary Examiner*—Dennis H. Pedder
*Assistant Examiner*—Jason Morrow
*Attorney, Agent, or Firm*—Robert Treece

[57] ABSTRACT

The present invention is a retractable cargo box extension assembly for a cargo box having an area therein for hauling material. The invention includes a plurality of lift arm assemblies connected to a cargo box and to a top frame for selectively raising the top frame upwardly to an extended position and lowering the top frame to a retracted position. An interior wall connected to the top frame and extending down to the cargo box is provided for increasing the area in the cargo box when the lift arm assemblies are in the extended position. A closed loop drive system is connected to each of the lift arm assemblies and to one or more actuator means for simultaneously operating each of the lift arm assemblies when raising or lowering the top frame.

14 Claims, 6 Drawing Sheets

AUTOMATED CARGO BOX EXTENSION ASSEMBLY

BACKGROUND OF THE INVENTION

1. Field of the Invention

The present invention relates to cargo box extensions generally and more particularly to cargo box extensions for selectively increasing the height of existing cargo box walls and thereby expand the useful area of the cargo box. Even more particularly the current invention relates to cargo box extensions having a plurality of lift arm mechanisms connected together by a closed loop drive system.

2. Description of the Prior Art

Various devices have been used in the past to selectively increase the cargo area of a cargo box, however these devices include many common disadvantages. Prior to the current invention, various lifting mechanisms were utilized to raise tops or walls, but the lifting mechanisms were powered individually or at best in pairs. This allowed some of the lifting mechanisms to advance faster than others such that there was an uneven lifting or retraction of the extension which often allowed the device to bind and to jam. For example U.S. Pat. No. 4,703,971 issued to Schmeichel et al. shows a cargo box extension having multiple lift mechanisms each of which requiring independant manual operation.

In addition, the prior art devices had many of the working parts contained inside the cargo area where they were difficult to reach, repair or protect from the cargo in the box.

SUMMARY OF THE INVENTION

In view of the foregoing disadvantages inherent in the known types of automated cargo box extension assemblies now present in the prior art, the present invention provides an improved automated cargo box extension assembly construction wherein the same can be utilized reliably in those situations where operation from the ground is desired. As such, the general purpose of the present invention, which will be described subsequently in greater detail, is to provide a new and improved automated cargo box extension assembly which has all the advantages of the prior art cargo box extension devices and none of the disadvantages.

To attain this, the present invention essentially comprises a frame and a pliable wall for attachment to a cargo box sidewalls. The pliable wall is attached to the frame and the frame attaches to the upper edge of the cargo box sidewalls. The frame may be extended or retracted to increase or decrease the height and load area of the cargo box through the use of a closed loop linkage/lift system. The linkage system is accessible, and may be maintained from outside the cargo box.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will from the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automated cargo box extension assembly which may be easily and efficiently manufactured, marketed, and is easily adaptable to cargo box sidewalls for substantially increasing the height and load area.

It is a further object of the present invention to provide a new and improved automated cargo box extension assembly which is of a durable and reliable construction which need not be removed form the cargo box when not in use, but will allow the use of the cargo box when the assembly is in an extended or a retracted position.

An even further object of the present invention is to provide a new and improved automated cargo box extension assembly which is susceptible of a low cost of manufacture with regard to both materials and labor, and which accordingly is then susceptible of low prices of sale to the consuming public, thereby making such extension assembly economically available to the buying public.

Still another object of the present invention is to provide a new and improved automated cargo box extension assembly which provides some of the advantages of the prior art, while simultaneously overcoming some of the disadvantages normally associated therewith.

Another object of the present invention is to provide a new and improved automated cargo box extension assembly which may be operated from the ground and provides structural sturdiness under severe wind and load conditions.

Yet another object of the present invention is to provide an new and improved automated cargo box extension assembly which is an efficient alternative to using a permanent extension by quickly expanding the load area of an existing cargo box when needed and retracting for decreased wind drag for better fuel efficiency when retracted.

Another object of the present invention is to provide a cargo box extension assembly with a closed loop linkage lift system which can be maintained without entering the cargo box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3A is an elevation of another embodiment of the lift arm assembly of FIG. 2.

FIG. 5A is another cross sectional view of the lift arm assembly of FIG. in the partially extended position.

FIG. 5B is yet another cross sectional view of the lift arm assembly of FIG. 5 in the retracted position.

DETAILED DESCRIPTION OF THE PREFERRED EMBODIMENTS

Figure 1:
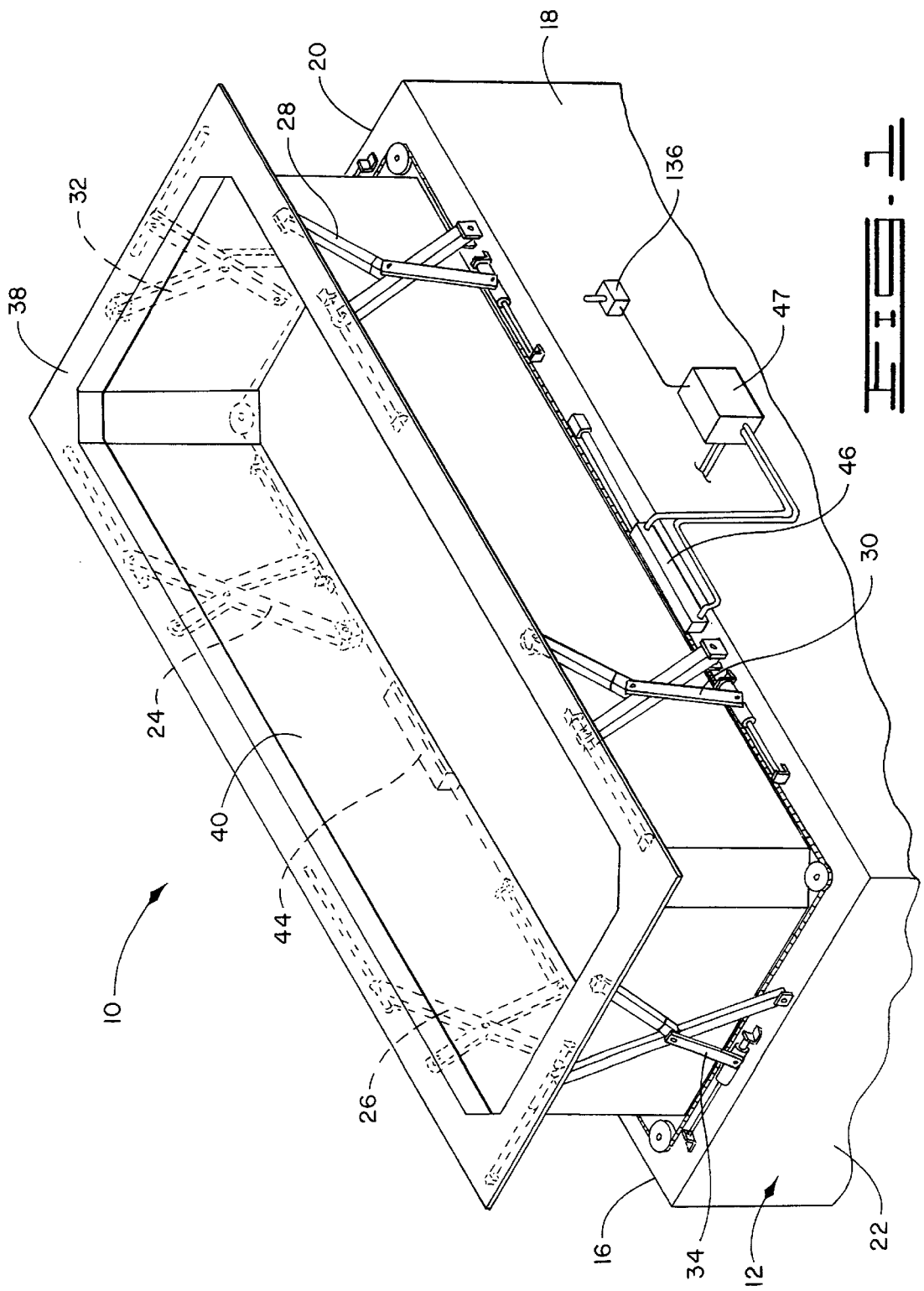
FIG. 1 is a perspective view of a automated cargo box extension assembly constructed in accordance with the present invention.

Referring to the drawings in detail and to FIG. 1 in particular, reference character 10 generally designates an automated cargo box extension assembly constructed in accordance with the present invention. The cargo box extension assembly 10 may be mounted to the top of existing cargo box walls 12, such as a cargo box on a truck or trailer. The cargo box extension assembly is particularly suitable for mounting on cargo trailers such as are commonly pulled by semi-tractors when hauling less dense commodities such as, for example and not by way of limitation, mill feeds, cotton seed, rice, peanuts, peanut hulls or the like.

The cargo box extension assembly includes a plurality of lift arm assemblies. While the number an placement of lift arm assemblies may be varied somewhat depending on the size of the cargo box. A typical semi-trailer cargo box as shown in FIG. 1 has two long sides (a left 16 and a right 18) and two short sides (a front 20 and a back 22). A cargo box assembly 10 for this type of trailer preferably has a left front arm assembly 24, a left rear arm assembly 26, a right front arm assembly 28, and a right rear arm assembly 30. It is also preferred to have a front arm assembly 32 and a rear arm assembly 34.

The lower end of the arm assemblies are connected either directly or indirectly to the upper edge of the cargo box walls 12. Preferably they are indirectly connected such as by connecting the arm assemblies to a base frame 36 (FIG. 2) and then connecting the base frame 36 to the cargo box walls 12. In this way the cargo box extension assembly may be easily added to existing cargo box walls such as by bolting, screwing, or welding the base frame 36 to the cargo box walls. Preferably removable fasteners, such as bolts, are used to allow easy removal of the cargo box assembly 10.

The lower end of the arm assemblies 24, 26, 28, 30, 32 and 34, are connected to a top frame 38, and a flexible interior wall 40 is connected to both the top frame 38 and to base frame 36. One suitable flexible material for the flexible interior wall 40 is canvas. In this case, where no base frame 36 is used, the flexible interior wall 40 is connected directly to the cargo box walls 12. It should also be noted that in place of the flexible interior wall 40, a wall constructed of rigid or semi-rigid material may be used. In such a case the lower end of the wall is not connected to the base frame 36 but instead slides against the interior of the cargo box.

A closed loop linkage system is also connected to the base frame 36 and to the arm assemblies. The closed loop linkage system is powered by one or more actuator cylinders, such as cylinders 44 and 46 which are controlled by a power/ control unit 47.

Figure 2:
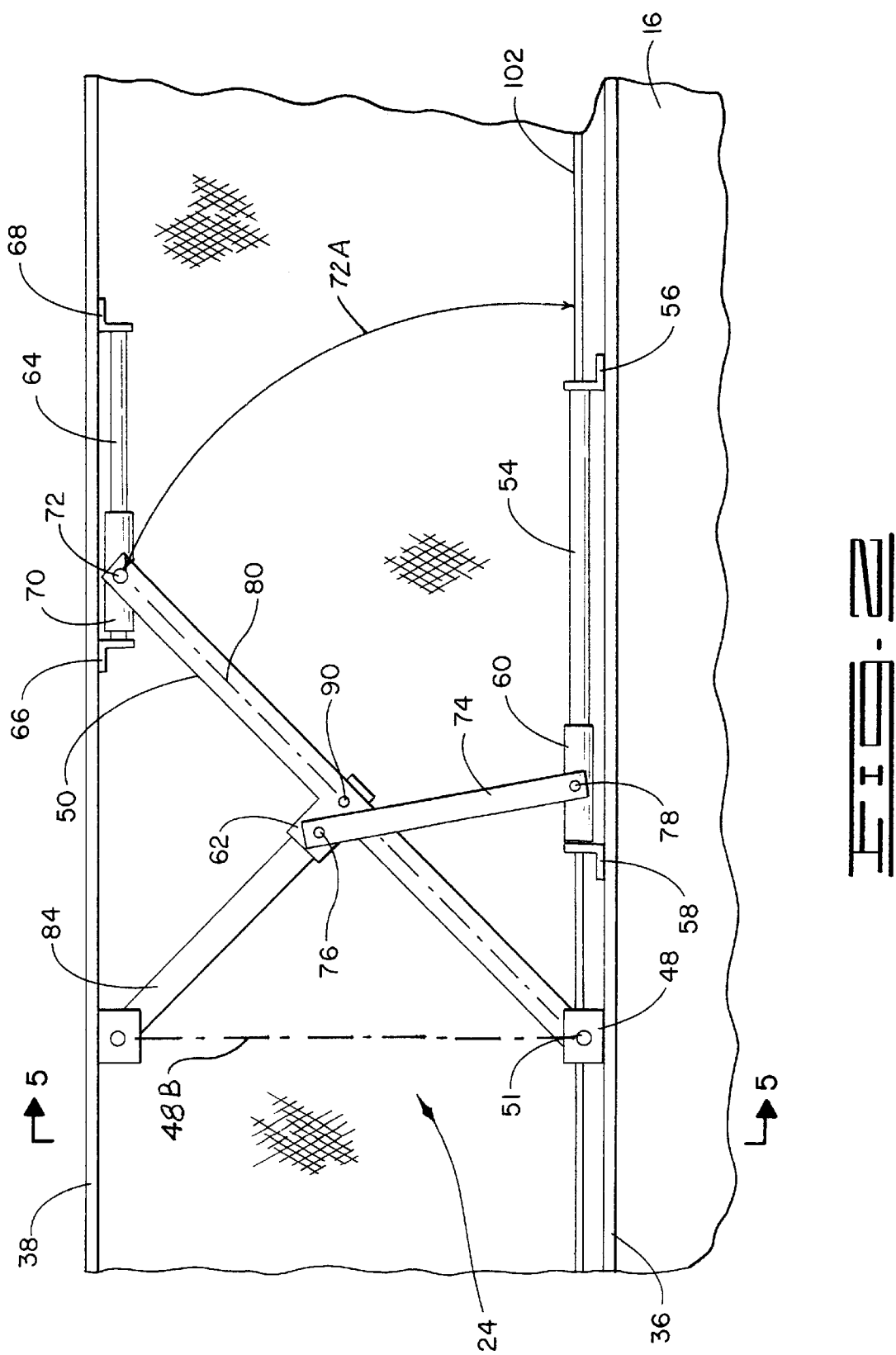
FIG. 2 is an elevation of a lift arm assembly for the invention of FIG. 1 in an extended position.
Figure 3:
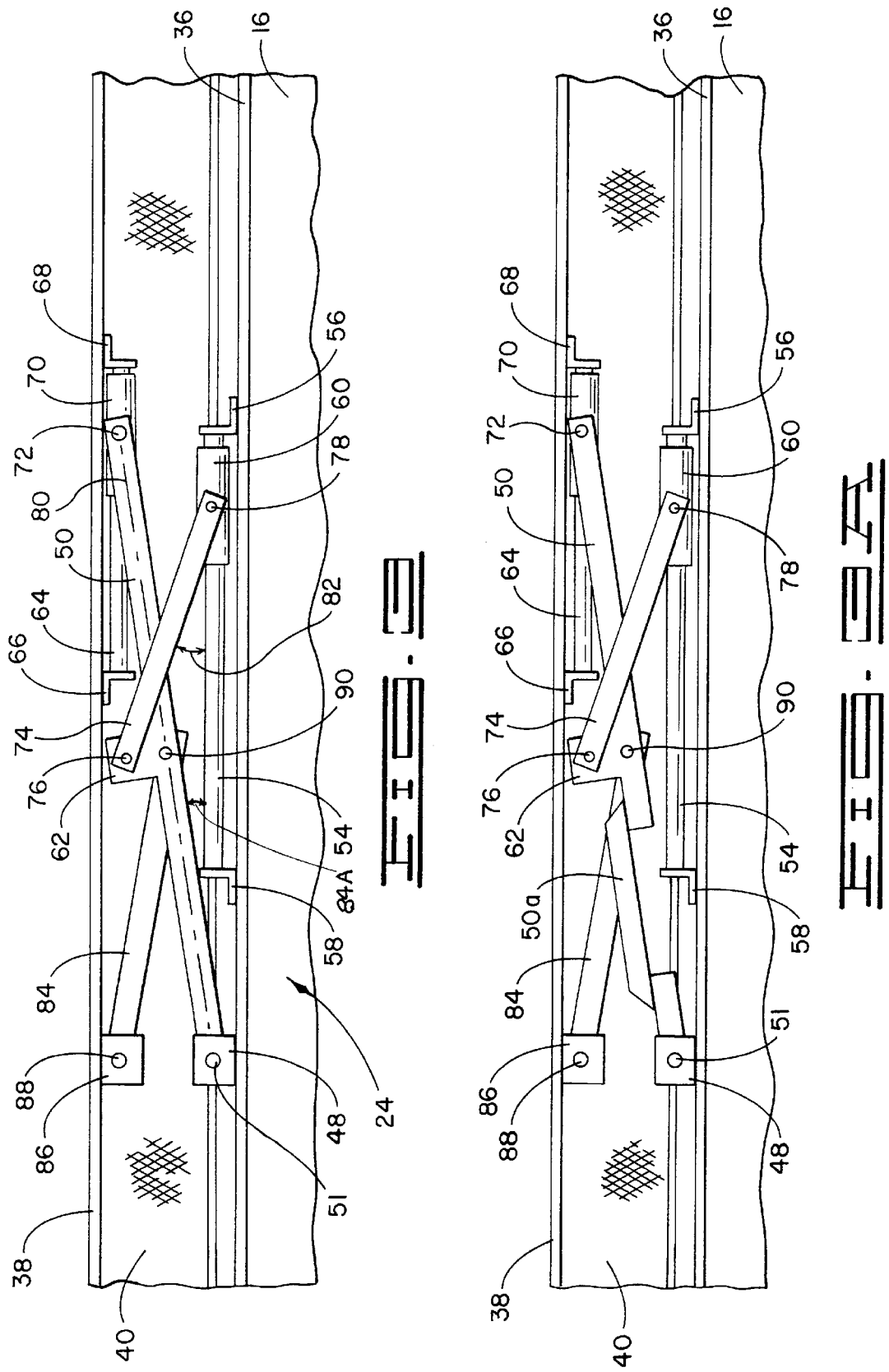
FIG. 3 is an elevation of the lift arm assembly of FIG. 2 in a retracted position.

Referring now to FIGS. 2 and 3, shown therein is lift arm assembly 24. Since each lift arm assembly may be similarly constructed only one lift arm assembly will be described in detail. The lift arm assembly 24 has a lower anchor bracket 48 connected to the base frame 36 and pivotally connected to a lift brace 50 at a pivot point 51. The lift brace 50 is an elongated linear member which pivots about an axis normal to the cargo box wall 16, and extends diagonally above and parallel to the cargo box wall 16.

A lower slide track 54 is an elongated member with mounting brackets 56 and 58 on each end thereof. The lower slide track extends parallel to the cargo box wall 16 and is held in a fixed horizontal position by the mounting brackets 56 and 58 which connect the slide track to the base frame 36. A lower slide 60 is slidingly connected to the lower slide track 54. While several different combinations of slide track and slide will work, a simple and inexpensive slide track 54 may be made from a tube or rod and in such a case a slide 60 can be made from a section of tubing or pipe.

The upper end of the lift brace 50 is pivotally connected to the an upper slide 70 at pivot point 72. The upper slide is slidingly connected to the top frame by an upper slide track 64, mounting flanges 66 and 68 as described in reference to the lower slide track 54 above.

A lift flange 62 is provided along the length of the lift brace 50 and extends upwardly there from. Preferably the lift flange 62 is generally midway between the ends of the lift brace 50, but the lift flange may be moved closer to the bottom or the top of the lift brace. However, it should be noted that by moving the lift flange 62, its leverage is changed and thus the power required and the distance the top frame 38 can be raised is changed.

An actuator arm 74 is pivotaly connected to the lift flange 62 at pivot point 76 and extends downwardly to the lower slide 60. The lower end of the actuator arm 74 is pivotally connected to the lower slide 60 at pivot point 78.

It is important to note that the pivot point 76 is above a line 80 drawn through pivot points 51 and 72. As may be best seen in FIG. 3A, this configuration allows for great retraction of the lift arm assembly without unduly increasing the power required to extend the lift arm assembly. By positioning the pivot point 76 in this way, the angle 82 is increased when the lift arm assembly 24 is in the retracted position, and thus, providing enhanced leverage when extending the lift arm assembly. The angular degree 82 of the actuator arm 74 should exceed the angular degree 82A of the lift brace 50 while in a retracted position. This advantage in leverage not only lowers the power requirements and allows the lift arm to retract further, but also lowers the stress placed on the actuator arm 74 when extending the lift arm assembly.

An alignment brace 84 is connected between the lift brace 50 and the top frame 38 at alignment brace bracket 86. The connection between the top end of the alignment brace 84 and the alignment brace bracket 86 is pivotal at pivot point 88. The connection between the bottom end of the alignment brace 84 and the lift arm 50 is also pivotal and is connected at pivot point 90. The pivot point 90 is preferably on the lift arm 50 generally midway between pivot points 51 and 72 along line 80.

Referring now to FIG. 3A, a lift arm assembly of similar construction is shown. However, it has been found that the assemble will retract further and take up less space if the lift arm 50 includes an offset portion 50A. The offset portion 50A is spaced upward from the lift arm 50 to provide additional clearance between the lift arm 50 and the mounting bracket 58. Allowing for direct placement of 50 above slide track 54.

Figure 4:
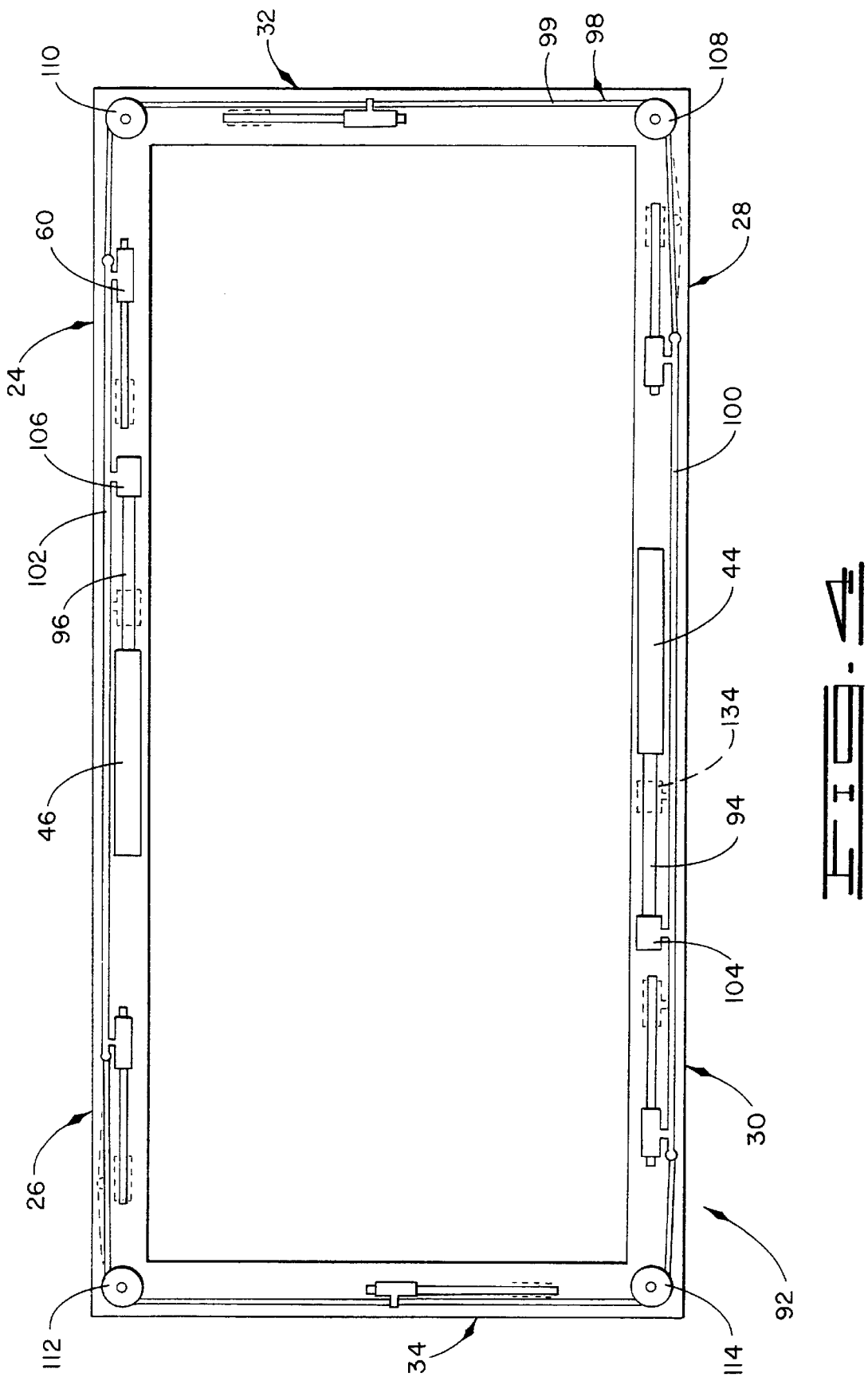
FIG. 4 is a top plan view of the automated cargo box extension of FIG. 1 with a top shield removed for clarity.

FIG. 4 illustrates a closed loop linkage system 92. The closed loop linkage system includes means for connecting each of the lift arm assemblies 24, 26, 28, 30, 32 and 34 to one or more actuator cylinders, such as hydraulic or pneumatic cylinders 44 and 66. It should be noted that while actuator cylinders are the preferred embodiment, other actuator means may be used to power the closed loop linkage system. Some suitable actuator means include but are not limited to, hydraulic, pneumatic and electric motors, and even manually operated actuator means such as cranks may be used. The cylinders 44 and 46 include reciprocating rams 94 and 96 which may be extended or retracted by activating control/power unit 47 (FIG. 1). The ends of the reciprocating rams 94 and 96 include a coupling means for connecting the reciprocating rams to the closed loop drive linkage 98. It should be noted that the entire closed loop may be cable (such as cable 99), but it has been found that the lift extends and retracts better if portions of the cable 99 are replaced with rods, such as rods 100 and 102 along the sidewalls. It is believed that the use of rods on the sides reduses stress on pulleys 108, 110, 112, and 114. Idler pulleys 108, 110, 112, and 114 are attached to the base frame near the corners thereof which route the cable 99 around the corners.

The rods and cables are attached to the lift arm assemblies lower slide as shown on lift arm assembles 24 where the rod 102 is connected to slide 60. In this way when the cylinders 44 and 46 are retracted the lift arm assembles are retracted, and when the cylinders 44 and 46 are extended the lift arm assembles are extended.

Figure 5:
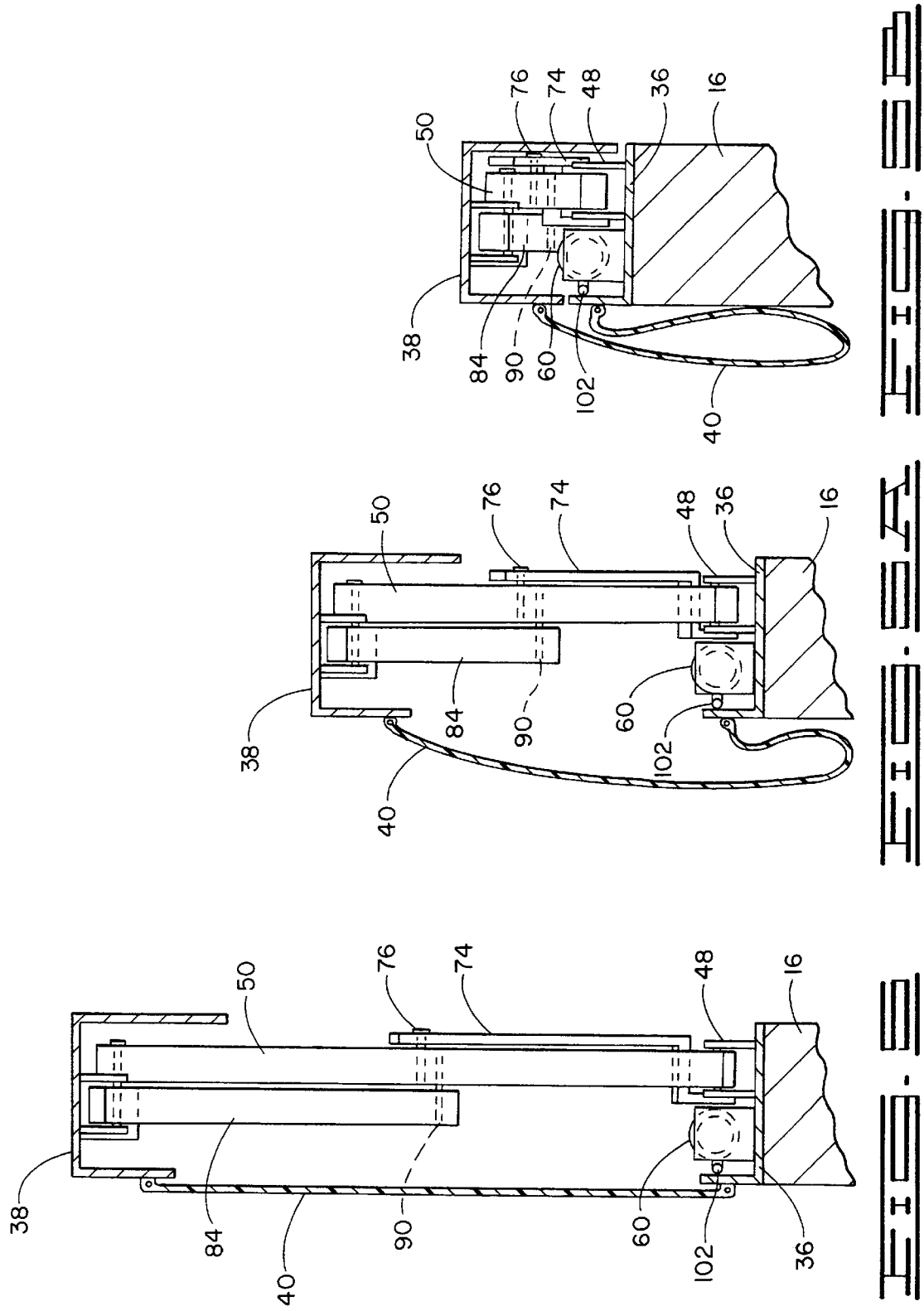
FIG. 5 is a cross sectional view of a lift arm assembly from FIG. 2 along line 2—2 in the extended position.

Referring now to FIGS. 5, 5A and 5B, shown therein is a cross-section of the cargo box extension assembly along line 5—5 of FIG. 2. FIG. 5, shows the lift arm assembly in a fully extended position. In this position the flexible interior wall 40 is pulled generally tight and works as an extension to the cargo box wall 16. In FIG. 5A, the lift arm assembly is a partially extended position and in FIG. 5B the lift arm assembly is in a retracted position. In the retracted position the flexible interior wall simply folds or hangs inside the cargo box.

Figure 6:
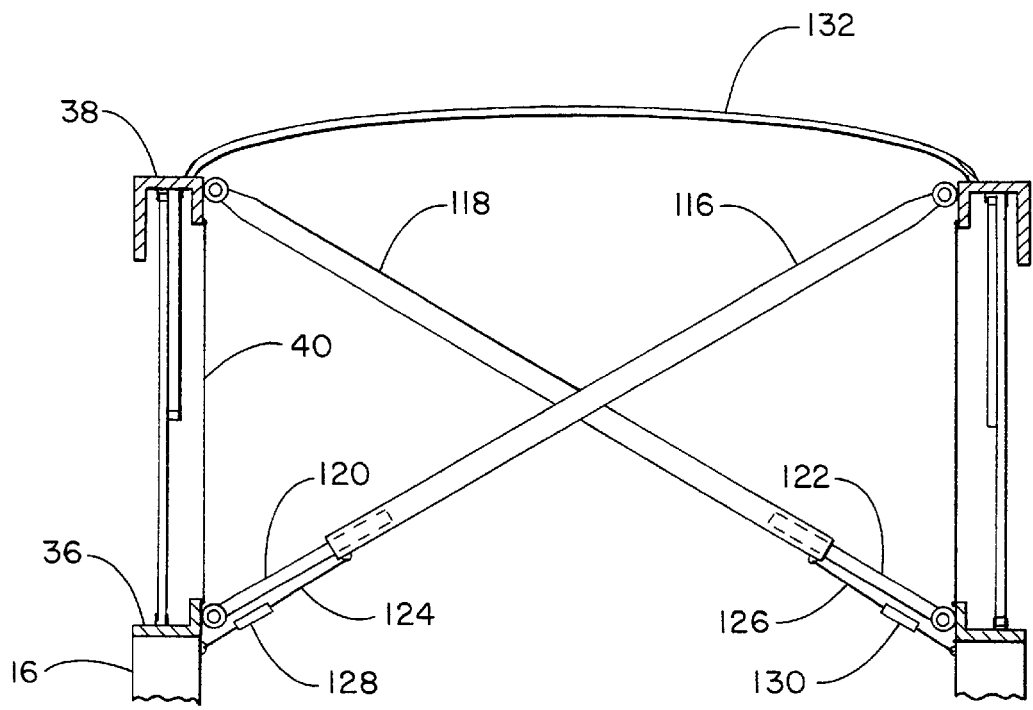
FIG. 6 is the cross sectional view of the lift arm assembly in an extended position and also showing cross bracing which may be included for stabilization.
Figure 7:
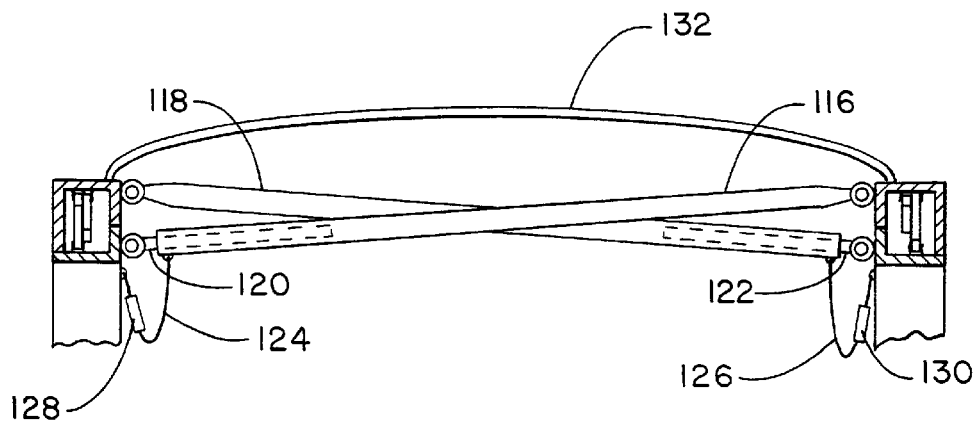
FIG. 7 is the cross sectional of the lift arm assembly of FIG. 6. showing the lift arm assembly in a retracted position and showing the cross bracing of FIG. 6.

FIGS. 6 and 7 show cross bracing which may be used to further stabilize the cargo box extension. The bracing includes one or more sets of cross members 116 and 118. The cross members are extendable to accommodate for the required change in length necessitated by the extending of the lift arm assemblies. One means to provide the extendability and still provide support is to use telescoping insets such as insets 120 and 122 in combination with stops 124 and 126. Several suitable stops may be provided, however a simple cable with a turnbuckle as shown in the Figures is preferred. The turn buckles 128 and 130 allow for adjustment of the maximum extension length for the cross members. A cross bow 132 may also be provided for additional support.

In operation, the cargo box extension assembly is raised into position by the cooperation of the horizontally spaced apart lift arm assemblies 24, 26, 28, 30, 32 and 34. As seen in FIGS. 3, 3A, 5B and 7, the top frame 38 is in a lowered or retracted position. In this position the flexible interior wall 40 resides within the cargo box walls in a relaxed position. In the retracted position the reciprocating rams 94 and 96 are in the retracted position, shown in phantom in FIG. 4. To start the raising operation, a control switch 136 for the power/control unit 47 is activated which provides a flow of fluid to and from the actuator cylinders 44 and 46. The control switch 136 may be located on the power/control unit 47 or may be located remotely, such as in the cab of a truck.

As the cylinders 44 and 46 are engaged, the rams 94 and 96 extend in cooperation, thereby moving the connected closed loop drive 98. The closed loop drive causes the collars (such as collar 60) to travel in a horizontal direction along the lower slide (such as slide 54). The resulting movement of the actuator arm 74 forces the lift brace 50 to pivot upward about the lower anchor bracket 48. The initial angular degree 82 of the actuator arm 74 provides needed leverage to assist the lifting operation. The actuator cylinder(s) must exert sufficient force to overcome any initial leverage disadvantage due to design limitations. Because each actuator arm is similarly attached to the reversible closed looped linkage/lift system, all lift mechanisms operate in a uniform motion. In addition, the closed loop drive serves to balance any uneven fluid flow experienced by respective lifting means during operation, further ensuring uniform motion.

As the lift brace 50 pivots about the lower bracket 48 at its base, its uppermost end moves along a semi-circular arcs, as seen in FIG. 2 along line 72A. The upper collar 70 is pivotally connected to the uppermost end of the lift brace 70, which slides along upper slide tract 64. Since all lift arm assemblies are interconnected by the closed loop linkage system, all lift arm assemblies are simultaneously operated. This provides a steady, uniform lift operation regardless of any unequal weight distribution of the top frame 38. As seen if FIG. 1, the lift arm assemblies located atop the cargo box end walls 20 and 22 not only contribute to the raising operation, but also keep the top frame 38 laterally immobile during the raising operation and when in extended position. The alignment braces such as 84 prevent lateral movement as the respective upper 86 and lower 48 anchor brackets maintain vertically parallel alignment, as seen in FIG. 2 along line 48B. The top frame now lies fixed in a horizontal plane to travel only vertically in general alignment with the cargo box outer walls 12.

The enclosing means, preferably flexible interior wall 40 is used to maintain a semi-rigid surrounding wall between the cargo box walls 12 and the movable top frame 38 when in the raised position. The enclosing means completely encircles the moveable top frame 38 and is attached to the perimeter of the top frame 38 and to the base frame 36 adjacent the upper edge of the cargo box walls 12. In the fully raised position, the canvas wall 40 should be in a taut condition having generally uniform horizontal and vertical tension throughout. In a partially raised position (FIG. 5A), only horizontally uniform tension is necessary. It should be noted that with a solid wall that telescopically engages within the cargo box body, the height of the moveable top may occupy various height positions. The canvas wall 40 provides a vertical barrier between the surrounding environment and the enclosed cargo area. The extended actuator rams 94 and 96 maintain position to keep the top frame 38 in a fixed vertical position during use, providing stability to the extension assembly.

The process of lowering is initiated by simply reversing the control switch 136 on the control/power unit 47. The actuator cylinder rams 94 and 96 retract which reverses the direction of the closed loop drive linkage 98, eventually moving and restoring the cargo box extension assembly 10 to the retracted state. The moveable top frame 38 is secured in a retracted position atop the cargo box walls 12 by the force of the actuator rams 94 and 96 thereby preventing blow off or destruction due to harsh wind or road conditions. In the retracted position the flexible material 40 assumes a relaxed condition within the cargo box body and may be formed in an accordion style pleat so that it stores neatly away therein.

Changes may be made in the combinations, operations and arrangements of the various parts and elements described herein without departing from the spirit and scope of the invention as defined in the following claims.

I claim:

1. A retractable cargo box extension assembly for a cargo box having an area therein for hauling material, comprising:
   a plurality of lift arm assemblies connected to a cargo box and to a top frame for selectively raising said top frame upwardly to an extended position and lowering said top frame to a retracted position;
   an interior wall connected to the top frame and extending down to the cargo box for increasing the area in the cargo box when the lift arm assemblies are in the extended position; and
   a closed loop drive system connected to each of the lift arm assemblies and to one or more actuator means for simultaneously operating each of the lift arm assemblies when raising or lowering the top frame, wherein the closed loop drive system comprises a cable extending from an actuator cylinder to each lift arm assembly and back to said actuator cylinder to form a closed loop.

2. The retractable cargo box extension assembly of claim 1 wherein the actuator means comprises one or more actuator cylinders.

3. The retractable cargo box extension assembly of claim 2 wherein the interior wall is made of a flexible material.

4. The retractable cargo box extension assembly of claim 3 further comprising a base frame connected the lift arm assemblies wherein the base frame is removably connected to the cargo box, and wherein said interior wall extends down from the top frame and is connected to the base frame.

5. The retractable cargo box extension assembly of claim 4 wherein the flexible material is canvas.

6. The retractable cargo box extension assembly of claim 4 wherein the lift arm assemblies comprise: a lift arm connected to the top frame and to the base frame; an actuator arm connected to the lift arm and to the closed loop drive system wherein the actuator arm causes the lift arm to raise the top frame when the closed loop drive system is operated in one direction and the actuator arm causes the lift arm to lower the top frame when the closed loop drive system is operated in an opposite direction.

7. The retractable cargo box extension assembly of claim 6 wherein the connection between the lift arm and the actuator arm is above a line drawn between the connection between the actuator arm and the top frame, and the connection between the actuator arm and the base frame.

8. The retractable cargo box extension assembly of claim 6 wherein one or more portions of said cable are replaced with one or more rods so that the combination of cable and one or more rods form a closed loop.

9. A retractable cargo box extension assembly for attachment to a cargo box comprising:
   a plurality of lift arm assemblies connected to a base frame and to a top frame for selectively raising said top frame upwardly to an extended position and lowering said top frame to a retracted position herein each lift arm assembly includes a lift arm connected to the top frame and to the base frame, and an actuator arm connected to the lift arm and to a drive system, wherein the drive system comprises one or more cables; and wherein the connection between the lift arm and the actuator arm is above a line drawn between the connection between the actuator arm and the top frame, and the connection between the actuator arm and the base frame; and
   a flexible interior wall connected to the top frame and extending down and connected to the bottom frame.

10. The cargo box extension assembly of claim 9 further comprising: a closed loop drive system connected to each lift arm assembly; and an actuator means connected to the closed loop drive system, wherein operation of the actuator means moves the closed loop drive system thereby causing the lift arm assembly to raise the top frame, and operation of the actuator means in an opposite direction moves the closed loop drive system in an opposite direction causing the lift arm assembly to lower the top frame.

11. The cargo box extension assembly of claim 10 wherein the closed loop drive system comprises one or more rods connected to said cables.

12. The cargo box extension assembly of claim 10 wherein actuator means comprises one or more actuator cylinders.

13. The cargo box extension assembly of claim 10 further comprising a switch for activating the one or more actuator cylinders.

14. The cargo box extension assembly of claim 10 wherein the flexible material is canvas.

* * * * *